June 15, 1948. H. O. THRALLS 2,443,208
MUTUALLY CONTROLLED CAMERA-SHUTTER AND FLASH-LAMP
Filed Sept. 7, 1944 3 Sheets—Sheet 1
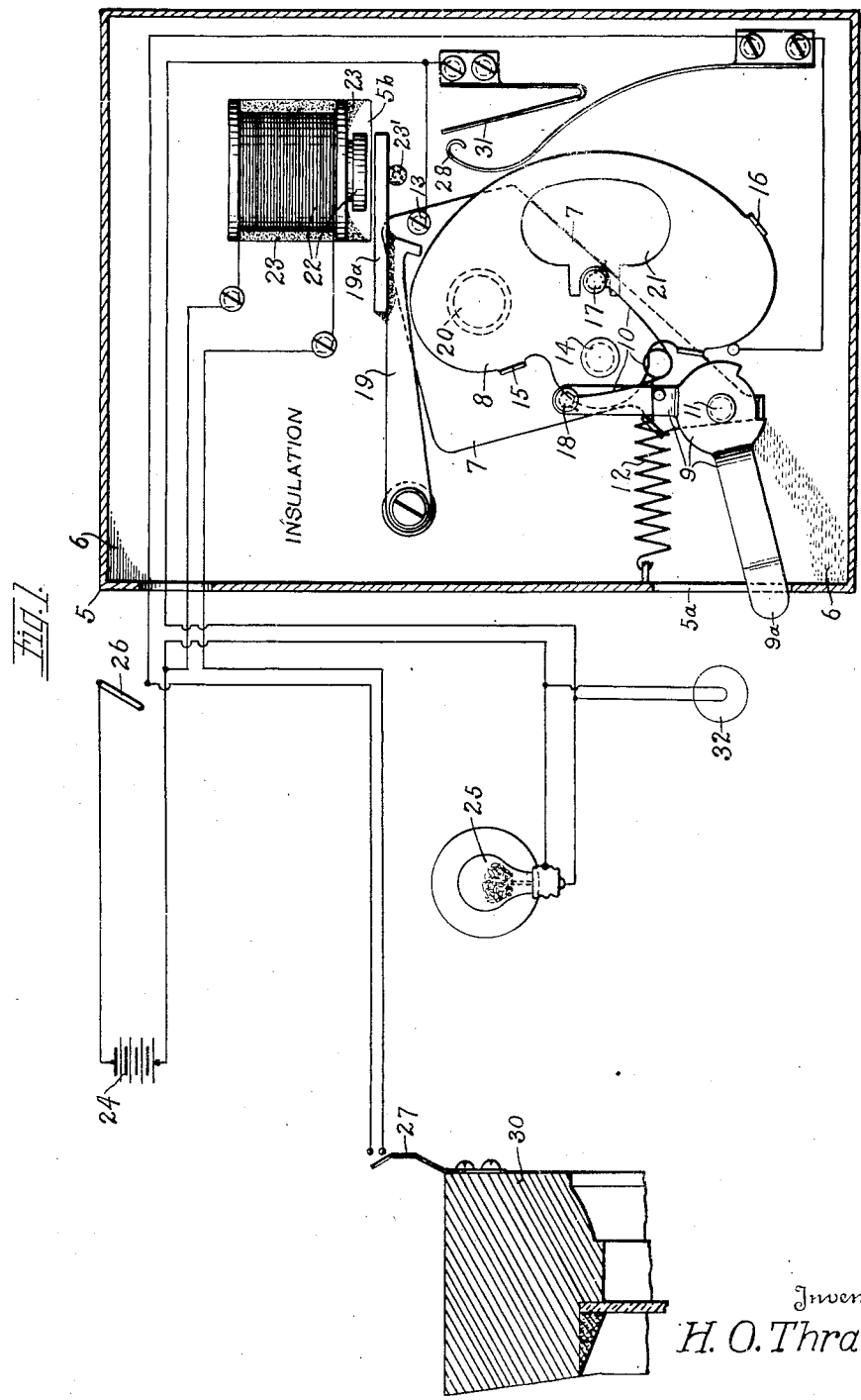
Inventor,
H. O. Thralls.
By Sterling P. Buck,
Attorney.

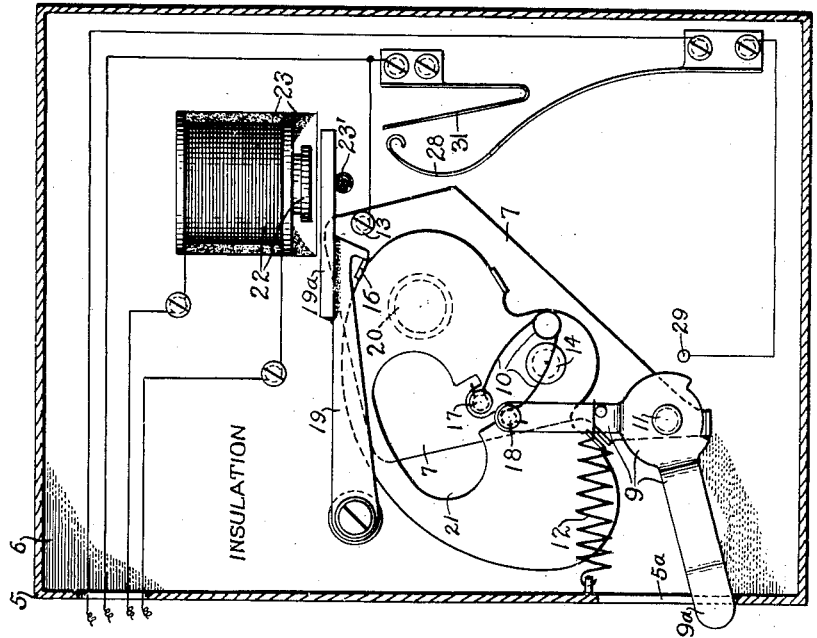
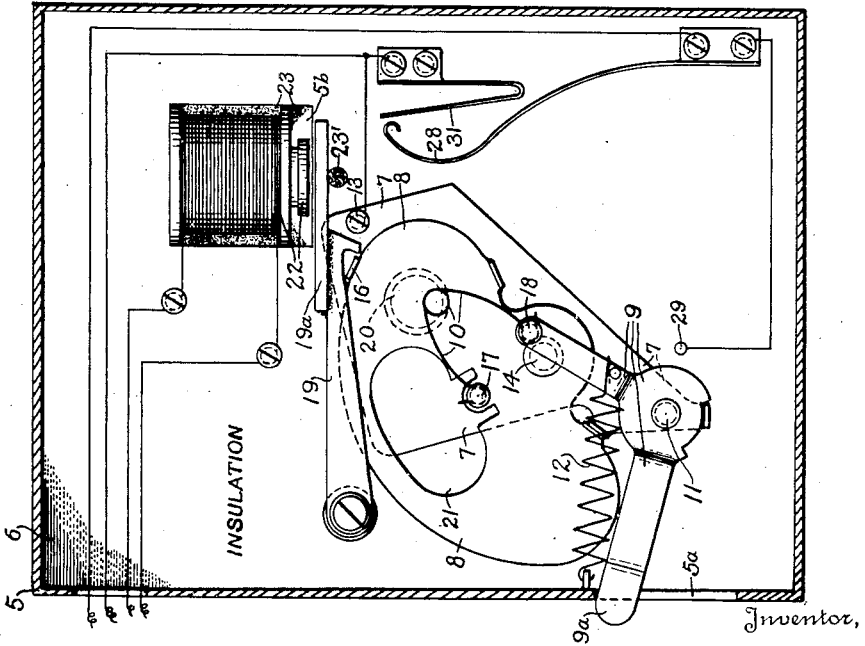

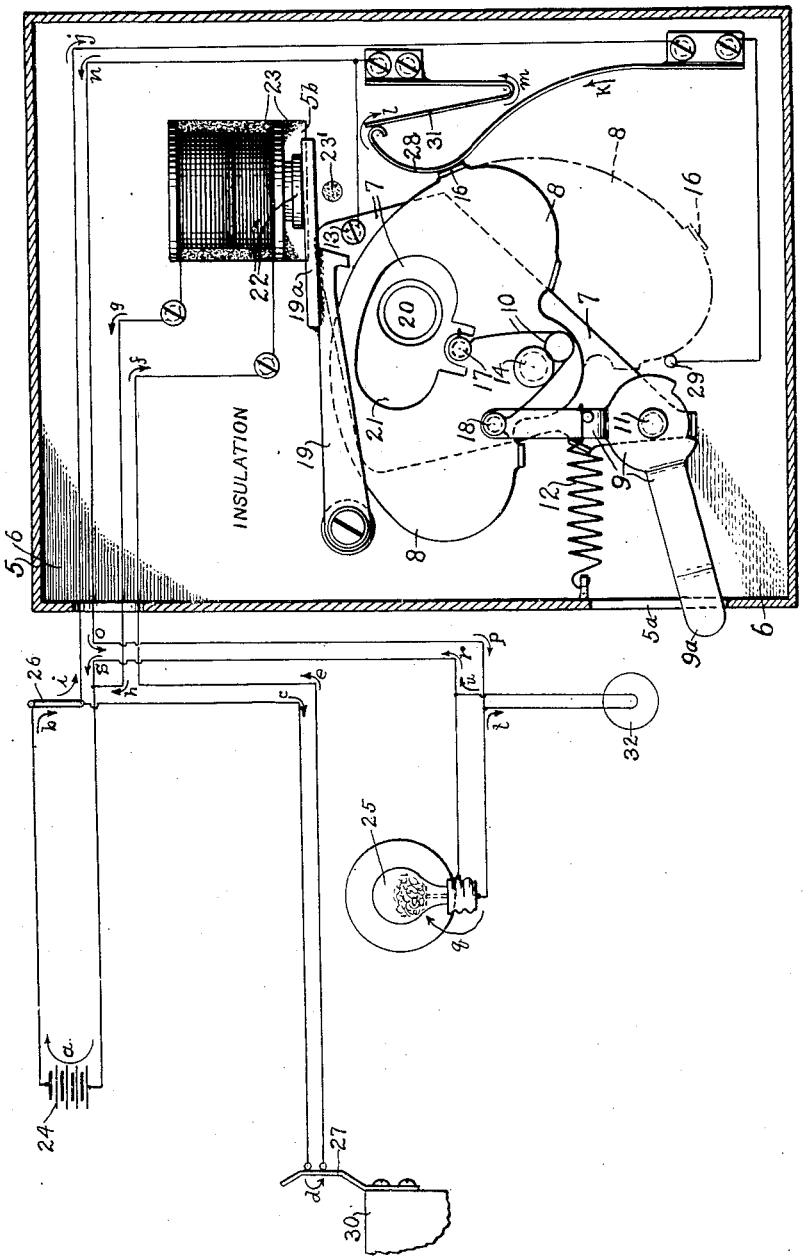

Patented June 15, 1948

2,443,208

UNITED STATES PATENT OFFICE 2,443,208

MUTUALLY CONTROLLED CAMERA SHUTTER AND FLASH LAMP

Harry O. Thralls, Glendale, Calif.

Application September 7, 1944, Serial No. 552,950

4 Claims. (Cl. 95—11.5)

This invention relates to a combination of mutually controlled camera-shutter and electric flash-lamp.

One object of the invention is to provide a camera of previously known construction with electrically controlled and electric-controlling attachments on the partition or plate on which the shutter-member and its actuating means are movably secured within the box or casing that carries the plate or film on which the photographs are to be taken; thereby maximizing compactness and convenience while minimizing cost of production.

Another object is to provide a combination of a camera with a detent that is effective to restrain the shutter against spring-action of its actuating means, viz., the means that moves the shutter from its primary window-closing position to its window-unclosing position and thence to its secondary window-closing position; and to provide emergency-actuated means to release the detent from the shutter-member and permit the shutter to move in the proper relation to open the objective window, so the camera will photograph the object located at the place where the emergency occurs, for instance, a burglar or intruder who raises a window-sash that is equipped with means for closing an electric circuit that is included in this invention.

Another object or purpose of this invention is to provide an electric system that is partly within the camera and partly projected or extended therefrom and external thereto, and which includes an electric flash-lamp synchronized to illuminate the object at the point of emergency at the instant of opening of the objective-window for exposing the object to the film or sensitized plate.

Other objects and important features are pointed out or implied in the following details of description, in connection with the accompanying drawings in which:

Fig. 1 is a view partly in vertical section and partly in diagram, showing a combination that constitutes an embodiment of my invention.

Fig. 2 is a view showing a group of correlated elements corresponding to those of Fig. 1, but the shutter-member being in its extreme leftward position, instead of the rightward position shown in Fig. 1.

Fig. 3 is a view of the same parts shown in Fig. 2, but the shutter-member and its actuating means being in positions differing from those of Fig. 2.

Fig. 4 is a view showing substantially all parts of the invention; but it shows them in operating positions, instead of in their normal or inactive positions shown in Fig. 1.

In each view of the drawings, the section is taken between the face-plate (not shown) and the partition or supporting plate that has the objective window therethru and has the shutter and other elements secured thereon.

Referring to these drawings in detail, wherein, similar reference numerals refer to similar parts throughout the several views, the invention is described in detail as follows:

First, however, it is explained that the box or casing 5, partition or plate 6, conducting plate 7, shutter-member 8, and shutter-actuating device 9—10—11—12, being of previously known construction and arrangement, are not claimed apart from the attachments correlated therewith; but their operation is here explained to facilitate an understanding of the novel features or attachments, as follows:

The conducting plate 7 is secured on the partition or insulating plate 6 by a screw 13, headed stud 11 that also forms a pivot for the bell-crank-lever 9, and a headed stud 14 that forms the pivot on which the shutter-member 8 is movably mounted or pivotally connected. The shutter-member constitutes the plane main portion that is juxtaposed to the plane conducting plate 7, and the projections 15 and 16 which serve respectively as a motion-limiting stop and as a detent-engaging element. A stud 17 also forms a part of the shutter-member, this stud being engaged with a hooked end of the V-spring 10 whose second hooked end is engaged with a stud 18 of the bell-crank 9.

An arm or manipulative element 9a of the bell-crank projects thru a slot 5a of the box 5, so it can be moved from the position of Figs. 1, 3 and 4 to the position of Fig. 2. During this movement of about 30 degrees, the upright arm of the bell-crank carries its attached end of the spring 10 between the pivot 14 and the stud 17, thereby compressing the spring 10 and causing it to snap the shutter-member 8 to its far-leftward position of Fig. 2, so the projection 16 is then under the hooked end of the detent 19, but not engaged with the hooked end; but when the user returns the bell-crank to the position shown in Fig. 3, the spring 10 starts the shutter-member towards its normal position (as in Fig. 1); but the detent 19 intercepts and detains the shutter-member by engagement with the projection 16 (see Fig. 3), against the motive-pressure of the spring 10, in one of the two window-closing positions of the shutter-member.

The plates 6 and 7 are provided with openings that substantially register with one another to form an objective window at 20 whose margin is shown in full lines in Fig. 4, thru the exposure-opening 21 of the shutter-member. The detent 19 has an armature 19a united therewith (by any appropriate inherent or extrinsic means) for co-operation with an electro-magnet 22 that is secured to the plate 5, preferably in a cavity 5b, by cement 23 or other appropriate means.

The magnet 22 is an element of an electric system that also includes an electric power-source or battery 24, an electric flash-lamp 25, a master-switch or preparatory switch 26, an emergency switch 27, a shutter-actuated switch 28, a circuit-closing contact 29, and conducting wires interconnecting these electric elements in the cooperative relation presently explained; and in this connection, it should be understood that the shutter member is of electric conducting material and, when in the dot-dash-line position of Fig. 4, serves as a circuit closer between the contact 29 and the conducting members 7 and 13, for a purpose hereinafter explained. For effecting the best or most efficient circuit thru the members 7 and 8, the pivot 14 is also a conductor.

The emergency switch 27 is shown on a window-sash 30, so, in the emergency of any unauthorized person raising the window-sash when the preparatory switch 26 is in closed position, the initial circuit is completed thru the magnet 22, as shown by the curved arrows $a, b, c, d, e, f, g, h$ (Fig. 4) thereby energizing the magnet and causing it to raise the armature from its normal position (on the insulated stud 23') and thereby raise the detent 19 from engagement with the projection 16, or detent-engaging portion of the shutter-member 8, releasing the latter and permitting it to snap or move continuously from the full-line position to the broken-line position of Fig. 4. On the continuous downward movement of the projection 16, it strikes the curved upper end-portion of the spring-switch-member 28 and forces the latter into contact with the spring-contact-member 31, closing the supplemental circuit that includes the flash-lamp 25 and the non-flash lamp 32; so the current from the battery 24 is now divided at the closing point of the preparatory switch 26, a part thereof going as previously stated, and the remainder following the curved arrows $i, j, k, l, m, n, o, p, q, r$, and $s$, except that portion of the current that goes thru the non-flash lamp 32, and returns to the battery 24.

While the supplemental circuit is closed thru 28—31 the window 20 is open and exposed thru the exposure-opening 21 of the shutter-member 8, so the exposure and flash are synchronous or simultaneous; and though the flash-lamp and emergency switch are here shown diagrammatically, without respect to proper positioning in relation to the front of the camera, it is of course intended that the camera shall be properly focused on the window-sash 30 or on any point adjacent to the emergency-switch 27 where the emergency may be expected to occur, for instance, on a package left at a point dictated or designated by a kidnapper or other extortionist or racketeer, in which case, the emergency switch could be correlated with the package in any appropriate way for being closed upon movement of the package. In cases of this kind and in some other cases, the flash-lamp should immediately become darkened, so the person photographed cannot quickly and easily locate and take the camera and the photograph taken thereby, and in such cases, the lamp 32 should be omitted. However, assuming the emergency switch is on a money-drawer or safe in a store, factory or other building; or at the cashier's desk or booth in a bank, restaurant etc.; and assuming that a "hold-up" is attempted at any such point, and a confederate turns off the lights or cuts the lighting circuit; in these circumstances, the emergency switch could be closed by a foot or knee of the cashier, and the flash lamp and camera could be located at rear of the point where the "hold-up man" would be likely to stand, facing the camera. The flash in his face would so disconcert him and blind him that the cashier could drop out of his sight; but immediately the lamp 32, or any desired member thereof of emergency-indicating colors and in pre-arranged positions would become re-lighted by closing of the circuit through elements 29, 8, 7 and 13; so the intruder would not only be photographed, but would be announced to police and others who might be present or near enough to prevent escape of the would-be "hold-up-man."

Since the arrangement of parts, both electrical and mechanical, are subject to numerous changes within the scope of the inventive ideas, such arrangement is not specifically claimed, and the scope of my invention is not limited thereto; but what I claim as my invention is as follows:

1. A camera that includes a plate having an objective window therethru for exposure of an object to be photographed, a one-piece shutter-member secured on said plate in a proper relation to be movable continuously from a window-closing position to a window-unclosing position and to continue thence to a second and different window-closing position, in combination with a detent secured to said plate in a proper relation to be movable into and out of detaining engagement with said shutter-member, an armature united with said detent; and an electric system that includes an electro-magnet secured on said plate in a proper relation to cooperate with said armature for moving said detent out of engagement with said shutter-member, an electric power-source, an electric flash-lamp, a preparatory switch, an emergency switch cooperative with the preparatory switch and power-source for energizing said electro-magnet, a shutter-actuated switch secured on said plate in a proper position to be struck and closed by said shutter-member as the latter moves in its window-unclosing position and thereby to complete the electric circuit through said flash-lamp while the objective window is open.

2. The combination defined by claim 1, a non-flash or continuous-light-lamp electrically connected in parallel with said flash-lamp, said shutter-member being of electric-conducting material and being in circuit-closing connection with said electric system when the shutter-member is in its second window-closing position so that the non-flash lamp remains illuminated after the flash-lamp ceases to illuminate.

3. A camera that includes a plate having an objective window therethru for exposure of an object to be photographed, a one-piece shutter member movably secured on said plate and having a projection thereon, and actuating means movably secured to said plate and operable to move said shutter member continuously from a primary window-closing position to a window-unclosing position and thence to a second window-closing position, in combination with a detent movably secured to said plate and adapted to engage with and detain said projection and shutter member while said actuating means tends to force the shutter member from its primary window-closing position, an armature united with said detent; and an electric-conducting system that includes an electro-magnet secured to said plate in a proper position to cooperate with said armature for moving said detent out of engagement with said projection and permitting the shutter member to move to its shutter unclosing position, an electric power-source, an electric flash-lamp, a preparatory switch, an emergency switch operable for cooperation with said power-source and preparatory switch for energizing said magnet and thereby causing said armature to move said detent out of engagement with said projection, and a normally open circuit-closing switch secured on said plate in a proper position to be struck by said projection when the shutter member is being moved from said primary window-closing position and thereby to complete the electric circuit through said flash-lamp substantially at the instant the shutter member arrives at the window-unclosing position.

4. A camera that includes an electric-insulating plate having an objective window therethru, a shutter member mounted on said electric-insulating plate and having a detent-engaging stop thereon and being movable from a window-closing position to and from a window-unclosing position in one continuous motion, in combination with a detent pivotally secured to said electric-insulating plate in a proper position to engage with said stop and thereby restrain said shutter member from moving until it is released, an armature operatively connected to said detent; and an electric-conducting system that includes an electric-power source, an electro-magnet in a proper position to actuate said armature and cooperate therewith and with said electric-power source for moving said detent out of engagement with said stop, an electric flash-lamp, a preparatory switch, an emergency switch, and a shutter-operated switch, the preparatory switch and emergency switch being electrically connected to said electric-power source and electro-magnet in a proper relation for closing a circuit thru said electro-magnet only when both of these switches are closed, said shutter-operated switch being electrically connected to said flash-lamp and properly constructed and positioned for being struck and closed by said stop when the shutter member is being moved in its window-unclosing position so that the electric circuit thru said flash-lamp is closed when the shutter member is in the unclosing position.

HARRY O. THRALLS.

REFERENCES CITED

The following references are of record in the file of this patent:

UNITED STATES PATENTS

| Number | Name | Date |
| --- | --- | --- |
| 1,954,673 | Krupnick | Apr. 10, 1934 |
| 1,968,597 | Blake | July 31, 1934 |
| 2,109,361 | Spiegel | Feb. 22, 1938 |
| 2,139,703 | Taylor | Dec. 13, 1938 |
| 2,284,486 | Hineline | May 26, 1942 |
| 2,350,258 | Steiner | May 30, 1944 |